United States Patent [19]

Frese et al.

[11] 4,440,642
[45] Apr. 3, 1984

[54] SEPARATING AND CLEANING APPARATUS FOR COOLING LUBRICANT

[75] Inventors: Elmar Frese, Düsseldorf; Gerhard Koch, Dortmund, both of Fed. Rep. of Germany

[73] Assignees: Mannesmann Aktiengesellschaft, Duesseldorf; Mayfran GmbH, Essen, both of Fed. Rep. of Germany

[21] Appl. No.: 396,597

[22] Filed: Jul. 9, 1982

[30] Foreign Application Priority Data

Jul. 11, 1981 [DE] Fed. Rep. of Germany ....... 3127440

[51] Int. Cl.³ .............................................. B01D 33/22
[52] U.S. Cl. .................................... 210/387; 210/168; 210/401
[58] Field of Search ............... 184/6.14, 6.21, 6.24; 210/167, 168, 387, 400, 401, 406

[56] References Cited

U.S. PATENT DOCUMENTS

| Re. 24,430 | 2/1958 | Hornbostel | 210/387 |
|---|---|---|---|
| 2,823,806 | 2/1958 | Harlan | 210/387 |
| 3,087,620 | 4/1963 | Hirs | 210/387 X |
| 3,091,336 | 5/1963 | Hirs | 210/387 X |
| 3,206,030 | 9/1965 | Estabrook | 210/387 X |
| 3,221,885 | 12/1965 | Hirs | 210/387 X |
| 3,305,094 | 2/1967 | Casson | 210/387 X |
| 3,310,172 | 3/1967 | Beduhn | 210/387 X |
| 3,330,416 | 7/1967 | Hornbostel | 210/387 |
| 3,332,553 | 7/1967 | Casson | 210/387 X |
| 3,334,749 | 8/1967 | Ladd | 210/167 X |
| 3,347,378 | 10/1967 | Arnold et al. | 210/387 X |
| 3,372,811 | 3/1968 | Arnold et al. | 210/387 |
| 3,455,457 | 7/1969 | Popelar | 210/168 |
| 3,506,128 | 4/1970 | Pashaian et al. | 210/387 X |
| 3,750,847 | 8/1973 | Sluhan | 184/6.14 X |
| 4,005,018 | 1/1977 | Wyman et al. | 210/387 X |
| 4,062,780 | 12/1977 | Estabrook | 210/401 |
| 4,071,451 | 1/1978 | Wood | 210/168 X |

FOREIGN PATENT DOCUMENTS

| 1218406 | 12/1966 | Fed. Rep. of Germany . | |
| 1298082 | 6/1969 | Fed. Rep. of Germany | 210/168 |
| 2434809 | 1/1976 | Fed. Rep. of Germany | 210/168 |

*Primary Examiner*—Robert H. Spitzer
*Attorney, Agent, or Firm*—Schwartz, Jeffery, Schwaab, Mack, Blumenthal & Koch

[57] ABSTRACT

Apparatus for returning cooling lubricant, which adheres to the swarf when machining metals, consisting of the combination of a swarf conveyor 2 for discharging the swarf with a vacuum filter unit 3 located therebelow for cleaning the cooling lubricant contaminated with the fine swarf. The swarf conveyor 2 as well as the vacuum filter unit 3 consists of horizontal flat box sections 2a,3a, which can be pushed below a machine tool 4, as well as of inclined flat box sections 2b or 3b for receiving the drives 31 or 15 for a hinge belt 5 of the swarf conveyor 2 or a scraper belt 16 of the vacuum filter unit 3 and for receiving a filter band storage roll 21, from which the scraper belt 16 withdraws a filter band 14. Since the liquid accumulating in the flat box section 2a and which is still contaminated, is able to flow over lateral openings 6 and lateral inlet boxes 7 of the vacuum filter unit 3 into its contaminated chamber 8, the overall height of the flat box sections 2a and 3a can be kept so low that these horizontal parts of the apparatus are located below the machine tools. The clean liquid collecting in a chamber 13 below a perforated plate 12 is sucked-off for re-use by a pump 22.

7 Claims, 2 Drawing Figures

SEPARATING AND CLEANING APPARATUS FOR COOLING LUBRICANT

BACKGROUND OF THE INVENTION

The invention relates to an apparatus for returning the cooling lubricant adhering to the swarf during the machining of metals in a machine tool, which lubricant becomes detached during the discharge of the swarf on an endless rotating steel hinge belt, in which case the hinge belt is guided in a full box frame constructed as a swarf conveyor, which consists of a straight flat box part and of a box-like ascending part and whereof the straight flat box part in accordance with its feed length can be pushed below the machine bed of the machine tool so that falling swarf immediately arrives on the hinge belt and the cooling lubricant runs down or trickles into the full box frame through the hinges or through additional holes in the hinge belt.

Systems of this type for separating swarf and coolant are known as swarf conveyors (Mayfran prospectus of swarf conveyors of the co-applicant) and are used widely in practical operation. A typical form of swarf conveyor consists of a straight flat box part with an adjoining ascending part, which is likewise constructed as a box frame. The length of the straight flat box part, which is known as the feed length, thus depends on whether one or more machine tools are to be served by the swarf conveyor. The endless hinge belt revolves in the full box frame. For operation, the swarf conveyor with the flat box section is set up below the machine run of a machine tool and the ascending part projects upwards beside the machine, where sufficient space is available, since below the machine bed itself, the available vertical space amounts to only approximately 40 cm, which is then almost completely filled by the flat box of the swarf conveyor. The quantity of swarf produced is continuously discharged and at the end of the ascending part drops from the hinge belt into a swarf container provided below the ascending part. During the conveying time, the cooling lubricant trickles or drips through the hinge belt and collects in the full box frame. From here the cooling lubricant is returned to the machine tool by means of pumps.

Since in most cases, the separate and external setting up of a filter unit anywhere close to the machine tool, to which the cooling lubricant from the swarf conveyor must firstly be pumped, proves unsuitable for reasons of space, hitherto it was tolerated that the cooling lubricant collected and re-supplied to the consumer, which still contains very fine swarf due to its previous use, has an unfavourable effect on the workpiece as regards the surface quality and on the tool as regards the reduction of its service life. Added to this is the fact that the life expectancy of the cooling lubricant is reduced by increasing contamination.

SUMMARY OF THE INVENTION

It is the object of the invention to remove the aforementioned drawbacks and without requiring additional space, to facilitate the filtering of the cooling lubricant separated from the swarf, so that the quality (cleanliness) of the cooling lubricant conveyed to the machine tool can be improved.

This object is achieved according to the invention due to the fact that located below the feed length of the straight flat box part of the swarf conveyor is the contaminated liquid of a vacuum filter unit, that at least one outlet opening for the cooling lubricant is provided on at least one side of the flat box part and that the outlet opening corresponds to an inlet box extending into the contaminated liquid chamber of the vacuum filter unit. Although the aforementioned spatial relationship below a machine tool, measured accurately above all as regards height (approximately 40 cm) namely the superposed integration of a swarf conveyor with filter unit, must seem impossible, in this case it can be achieved, because the known vacuum filter unit has a similar construction to the known swarf conveyor, namely a straight flat box part with an ascending part or with an ascending discharge arm. The cooling lubricant passes through the outlet opening opening into the inlet box, in which case the full box frame serves as a distributor, into a filter unit, which is operated as a vacuum filter. The contaminated liquid is firstly located in an upper chamber, which is separated from a lower chamber by a filter layer support constructed for example as a perforated plate or as a slotted sieve plate. A filter band or filter fleece can be guided on the filter layer support, which band or fleece is held down by an endless revolving scraper belt. In addition, the scraper belt has the task of supplying impurities remaining on the filter band or on the slotted sieve plate to a collecting container for the dirt. On the other hand, the clean cooling lubricant is conveyed by means of a filter pump to the consumer, namely the machine tool. In addition to the gravity or the hydrostatic pressure over the filter layer support bringing about the filtering effect one way or another, the filter pump promotes the passage of the contaminated cooling lubricant, in that the pump produces a vacuum by suction in the lower chamber. After a certain time, the impurities which are held back lead to the formation of a cake of dirt over the filter layer. When the cake of dirt becomes too thick, a vacuum switch is actuated. The vacuum filter is then ventilated and the filter band moves on automatically by one step, so that a new section of the filter band comes into use. During the changing time, the supply of cooling lubricant is ensured due to a feed from a full reserve tank. The aforedescribed vacuum filter is likewise known in practice and is widely used (SACK prospectus—automatic vacuum filter of the co-applicant; German Patent Specification No. 1 218 406).

The invention also proposes that with a vacuum filter consisting of a straight flat box part and an ascending discharge arm with terminating discharge head, part of the discharge arm is constructed as a regeneration tank, and according to a further embodiment of the invention it is provided that the filter band is supplied from a storage roll and the withdrawal of the contaminated filter band takes place from the discharge head. Due to these measures, it is advantageously possible to provide the known vacuum filter, which depending on the type of installation has a height of approximately 70 to 250 centimeters, i.e. up to six times the available space below a machine tool—solely of the straight flat box part, in the extremely low type of construction. Despite the additional regeneration tank in the dishcarge arm and the filter band supply from the discharge head, further details of which will be given hereafter, the discharge arm and ascending part manage with the same space outside the machine tool, which was otherwise filled solely by the swarf conveyor.

One embodiment of the invention provides that the discharge head is constructed as a swarf slide. The compact construction of the swarf conveyor and vacuum filter unit makes it possible for the swarf discharged by the conveyor and the used filter band of the filter to arrive in a common dirt container, which is located below the discharge arm or ascending part, in which case the swarf dropping from the swarf conveyor is guided by the swarf slide into the dirt container.

According to one proposal of the invention, it is provided that a common drive motor is available for the rotating hinge belt and the scraper belt. In this case, the motor driving the hinge belt to achieve continuous rotation, can be connected for example to the chain wheels of the scraper belt by way of shafts, which can be connected by means of a clutch.

With a feed length of the straight flat box part covering several machine tools, it is provided according to the invention that the straight flat box part of the swarf conveyor projects many times over beyond the vacuum filter unit. In contrast to the swarf conveyor, whereof the flat box part is pushed for example below three or four machine tools, the vacuum filter has a very much shorter construction, since all the falling swarf must be caught by the swarf conveyor, but the cooling lubricant collected in the full box frame can enter the filter unit solely at the outlet opening or openings.

BRIEF DESCRIPTION OF THE DRAWINGS

The invention is illustrated in detail in the drawings with reference to one embodiment.

DETAILED DESCRIPTION OF THE PREFERRED EMBODIMENT

Figure 1:
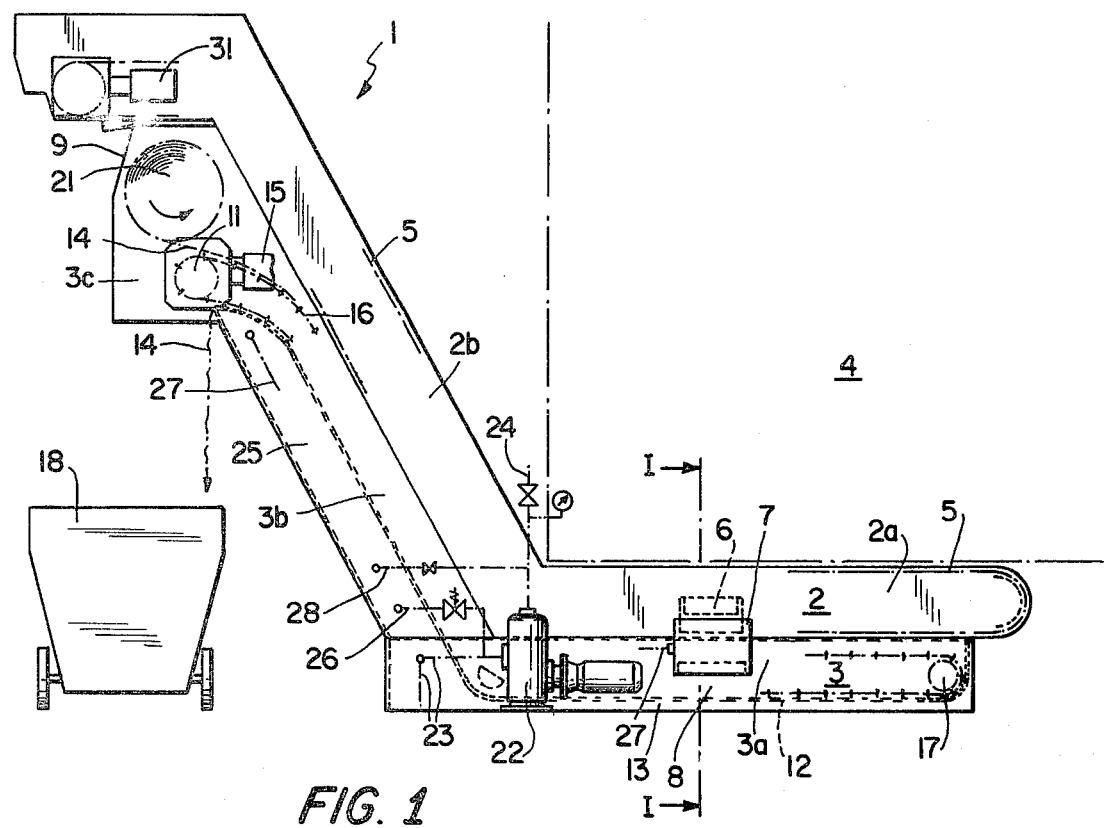
FIG. 1 is a side view of a separating and cleaning apparatus for cooling lubricant pushed below a machine tool, in partially diagrammatic form
Figure 2:
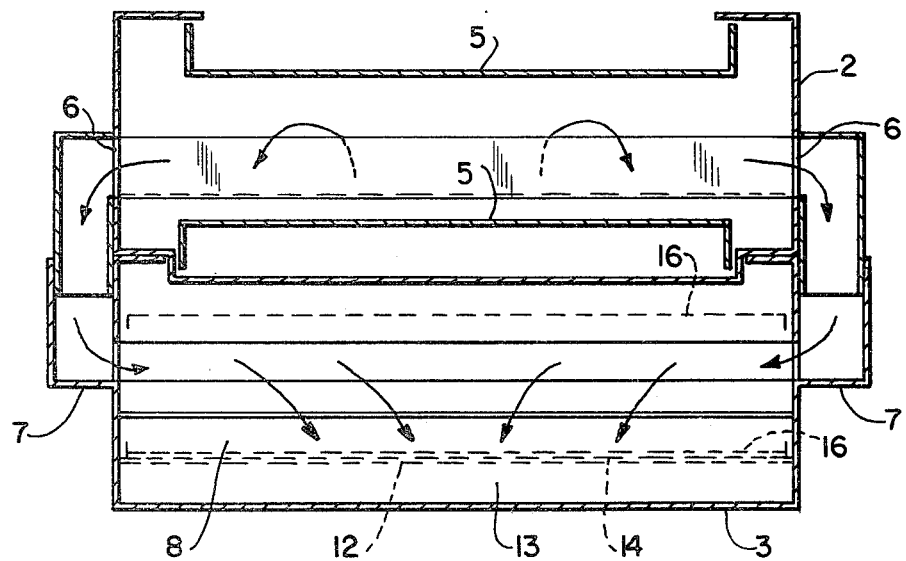
FIG. 2 is a section on line I—I of FIG. 1.

The unit of the separating and cleaning apparatus designated generally by the reference numeral 1 consists of the swarf conveyor 2 and the vacuum filter 3. The swarf conveyor 2 is placed on the vacuum filter unit 3. With their straight flat box sections 2a, 3a, the swarf conveyor and vacuum filter extend below the machine run of a machine tool 4 (indicated in the drawing). Swarf covered with cooling lubricant falls from the machine tool 4 directly onto an endless rotating hinge belt 5 located in the swarf conveyor 2, which is constructed as a box frame. The hinge belt 5 moves in the direction of the ascending part 2b, which adjoins the flat box section 2a. The swarf conveyed in this way drops at the upper most point of the ascending part 2b, where the hinge belt is once more guided, from the hinge belt 5 into the dirt container 18. On the other hand, during transportation, the cooling lubricant adhering to the swarf passes through holes or slots in the hinges into the box or collecting container below the hinge belt 5.

The cooling lubricant collected still contains fine and very fine swarf and passes by way of lateral outlet openings 6 in the straight flat box section 2a of the swarf conveyor 2 by way of an inlet box 7 of the vacuum filter 3 into the contaminated liquid chamber 8. The contaminated liquid chamber 8 is separated by a filter layer support in the form of a slotted sieve or a perforated plate 12 from a lower chamber 13 for the clean liquid. A filter band or fleece 14 is guided over the filter layer support, above all when the filter layer support is a perforated plate. Adjoining the straight flat box section 3a, the vacuum filter 3 comprises a discharge arm 3b ascending at the same angle as the ascending part 2b of the swarf conveyor 2, which arm terminates in the form of a discharge head 3c. Mounted in the discharge head 3c are chain wheels 11, which are driven by a motor 15 and convey an endless scraper belt 16, which is guided by a guide 17 in the straight flat box part 3a. The scraper belt 16 moves in the flat box section 3a above the filter band 14, so that the latter is held down against the perforated plate 12 and cannot rise. In addition, the scraper belt 16 discharges the used filter band and the deposited dirt, which falls from the discharge head 3c into a dirt container 18 located therebelow. In addition, the discharge head 3c is partially constructed as a swarf slide 9, so that the swarf dropping off at the guide point of the hinge belt 5 is guided by the swarf slide in a problem-free manner into the common dirt container 18.

Since the straight flat box section 3a of the vacuum filter 3 is located below the machine tool 4, the filter band storage roll 21 which was hitherto located here is shifted into the discharge head 3c, in which case the filter band supply takes place in such a manner that the filter band firstly rests on the upper side of the scraper belt 16, is entrained by the latter and after being guided around the guide 17, lying on the scraper band 16, is placed on the filter layer support. Used filter band sections likewise emerge above the discharge arm 3b and drop into the dirt container 18.

Located at the side of the straight flat box part 3a of the vacuum filter 3 is a filter pump 22, which projects by means of pipes 23 into the lower chamber 13 and at this point produces a vacuum which promotes the filtering action otherwise based solely on gravity. On passing through the filter band, the remaining harmful foreign substances are removed from the dirty liquid, which is supplied by the inlet box 7 below the upper side of the scraper conveyor and filter band. The remaining quantity of clean liquid is then conveyed by the filter pump 22 by way of the clean pipe 24 to the machine tool 4, whereas a small proportion is supplied by way of a branch pipe 28 to the regeneration tank 25. The regeneration tank 25, which is located in the discharge arm 3b, must always be full, in order to ensure the supply to the machine tool 4 during the time when the filter band is being changed. The pump 22 then draws the clean liquid from the regeneration tank 25 through the pipe 26. An overflow pipe 27, which opens into the inlet box 7, prevents the regeneration tank 25 from overflowing.

If the motor 15 is dispensed with, which moves the scraper band 16 in steps, the movement of the scraper band 16 can be produced by the drive motor 31 of the continuously rotating hinge belt 5, so that the device is operated solely with one motor 31 of the swarf conveyor 2. The driving power of the motor 31 for example may then be transmitted to the chain wheels 11 for the scraper band 16, by way of shafts, (not shown in detail) with an interposed clutch for the occasional connection of the shafts.

What is claimed is:

1. An apparatus for returning cooling lubricant adhering to swarf produced when machining metals in a machine tool, said apparatus adapted to be positioned under a working bed of said machine tool, comprising:
    a swarf conveyor comprising an endless conveyor belt, and a swarf conveyor guide frame guiding said conveyor belt, said swarf conveyor guide frame defining said swarf conveyor and having a straight substantially horizontal section with a free end to be positioned below said working bed and an ascending section terminating in a first discharge head whereby swarf removed from said cooling lubricant by said conveyor belt is discharged at said discharge head;

a filter unit for separating cooling lubricant from swarf comprising an endless scraper belt, and a filter unit guide frame guiding said endless scraper belt, said filter unit guide frame having a straight substantially horizontal section with a free end positioned below the straight substantially horizontal section of said swarf conveyor guide frame, and having an ascending section positioned below the ascending section of said swarf conveyor guide frame, said filter unit guide frame ascending section terminating in an upper and with a second discharge head;

a filter band storage roll disposed at said upper end of said filter unit and supplying filter band to an upper side of an upper run of said scraper belt, said filter band extending around said scraper belt and emerging as used filter band from said upper end of said filter unit;

a connection between said straight section of said swarf conveyor and said straight section of said filter unit for permitting cooling lubricant to flow from said swarf conveyor to said filter unit; and a pump for producing a vacuum in said filter unit for drawing cooling lubricant through said filter band.

2. An apparatus according to claim 1, wherein said ascending section of said vacuum filter includes a regeneration tank for providing a supply of clean cooling lubricant while said filter band is being changed.

3. An apparatus according to claim 1, wherein said second discharge head comprises a swarf slide.

4. An apparatus according to claim 1, wherein the length of the straight substantially horizontal section of said swarf conveyor is sufficient to extend under several machine tools located one behind the other, and wherein said straight substantstantially horizontal section of said swarf conveyor projects beyond said filter unit.

5. An apparatus according to claim 1, wherein said connection comprises at least one overflow outlet provided in a side of said swarf conveyor, an inlet opening provided in a side of said filter unit, and channel connecting said overflow outlet to said inlet opening.

6. An apparatus according to claim 1, wherein said filter unit has a clean liquid chamber and a contaminated liquid chamber, said clean liquid chamber being separated from said contaminated liquid chamber by a lower run of said scraper belt and said filter band, said filter pump having suction pipes extending into said clean liquid chamber.

7. An apparatus according to claim 1, wherein said endless conveyor belt is a hinged belt.

* * * * *